US011015071B2

(12) United States Patent
Brule et al.

(10) Patent No.: US 11,015,071 B2

(45) Date of Patent: May 25, 2021

(54) POLY—(ARYL-ETHER-KETONE) (PAEK) COMPOSITION WITH A LOW CONTENT OF VOLATILE COMPOUNDS AND USE OF SAME IN A SINTERING METHOD

(71) Applicant: Arkema France, Colombes (FR)

(72) Inventors: Benoît Brule, Beaumont-le-Roger (FR); Jérôme Amstutz, Charly (FR); Guillaume Le, Herouvile Saint Clair (FR); Julien Jouanneau, Corneville sur Risle (FR)

(73) Assignee: Arkema France, Colombes (FR)

(*) Notice: Subject to any disclaimer, the term of this patent is extended or adjusted under 35 U.S.C. 154(b) by 266 days.

(21) Appl. No.: 16/097,728

(22) PCT Filed: May 2, 2017

(86) PCT No.: PCT/FR2017/051043

§ 371 (c)(1),
(2) Date: Oct. 30, 2018

(87) PCT Pub. No.: WO2017/194855

PCT Pub. Date: Nov. 16, 2017

(65) Prior Publication Data

US 2019/0264045 A1 Aug. 29, 2019
US 2021/0115277 A2 Apr. 22, 2021

(30) Foreign Application Priority Data

May 9, 2016 (FR) ...................................... 1654131

(51) Int. Cl.

| | |
|---|---|
| ***C09D 11/102*** | (2014.01) |
| ***B33Y 10/00*** | (2015.01) |
| ***B33Y 70/00*** | (2020.01) |
| ***B29C 64/153*** | (2017.01) |
| ***C08G 65/40*** | (2006.01) |
| ***C08G 65/46*** | (2006.01) |
| ***C08L 71/00*** | (2006.01) |
| ***C08G 8/02*** | (2006.01) |
| *B29K 71/00* | (2006.01) |

(52) U.S. Cl.

CPC .......... *C09D 11/102* (2013.01); *B29C 64/153* (2017.08); *B33Y 10/00* (2014.12); *B33Y 70/00* (2014.12); *C08G 8/02* (2013.01); *C08G 65/4012* (2013.01); *C08G 65/4093* (2013.01); *C08G 65/46* (2013.01); *C08L 71/00* (2013.01); *B29K 2071/00* (2013.01); *C08G 2650/40* (2013.01)

(58) Field of Classification Search

CPC ... B29K 2071/00; C08G 8/02; C08G 65/4012
See application file for complete search history.

(56) References Cited

U.S. PATENT DOCUMENTS

| | | | |
|---|---|---|---|
| 4,611,033 | A | 9/1986 | Maresca |
| 4,698,393 | A | 10/1987 | Jansons et al. |
| 4,716,211 | A | 12/1987 | Clendinning et al. |
| 4,816,556 | A | 3/1989 | Gay et al. |
| 4,841,013 | A | 6/1989 | Towle |
| 4,912,181 | A | 3/1990 | Becker et al. |
| 9,162,392 | B2 | 10/2015 | Grebe et al. |
| 2015/0183918 | A1 | 7/2015 | Le et al. |
| 2018/0134891 | A1 | 3/2018 | Decraemer et al. |

FOREIGN PATENT DOCUMENTS

| | | | |
|---|---|---|---|
| CN | 103072282 | A | 5/2013 |
| WO | 9500446 | A1 | 1/1995 |
| WO | 2011004164 | A1 | 1/2011 |
| WO | 2013085947 | A1 | 6/2013 |
| WO | 2014013202 | A1 | 2/2014 |
| WO | 2014191674 | A1 | 12/2014 |

OTHER PUBLICATIONS

International Search Report and Written Opinion for International Application No. PCT/FR2017/051043, dated Jul. 7, 2017—9 pages.

International Preliminary Report on Patentability for International Application No. PCT/FR2017/051043, dated Nov. 13, 2018, 6 pages.

Mei, P. et al., "Fast determination of A1 residue in polyether ketone ketone by graphite furnace atomic absorption spectrometry," 2014, pp. 1702-1705, Chinese Journal of Analytical Chemistry (abstract only).

*Primary Examiner* — James Sanders

(74) *Attorney, Agent, or Firm* — RatnerPrestia

(57) ABSTRACT

Provided is a composition suitable for a process of building a three-dimensional object layer-by-layer by electromagnetic radiation-generated sintering, including at least one poly(aryl-ether-ketone) (PAEK), where the composition has an aromatic ether content of from 0 and 0.4% by mass, based on the total mass of the composition, and an aluminium mass content of lower than 1000 ppm. The composition may be used in process for building an object comprising sintering the composition with electromagnetic radiation. The present invention also includes a three-dimensional object obtained by such a process. A process for preparing the composition is also provided.

22 Claims, No Drawings

POLY—(ARYL-ETHER-KETONE) (PAEK) COMPOSITION WITH A LOW CONTENT OF VOLATILE COMPOUNDS AND USE OF SAME IN A SINTERING METHOD

CROSS-REFERENCE TO RELATED APPLICATIONS

This is the national phase of International Application No. PCT/FR2017/051043, filed May 2, 2017, which claims priority to French Application No. 1654131, filed May 9, 2016. The disclosure of each of these applications is incorporated herein by reference in its entirety for all purposes.

FIELD OF THE INVENTION

The invention relates to a Poly(aryl-ether-ketone) (PAEK) composition intended to be used in powder form in a process for additive, layer-by-layer fabrication of a three-dimensional object, by electromagnetic radiation-generated sintering of said powder. More specifically, it concerns a Poly (aryl-ether-ketone) (PAEK) composition with a low content of volatile compounds.

Said electromagnetic radiation can be infrared radiation or ultraviolet radiation from a laser beam, in the case of laser sintering, or any other source of radiation. The term "sintering" in the present description includes all these processes, regardless of the type of radiation. Although the following text most often refers to the laser sintering process, what is written for that process is of course valid for the other sintering processes.

DESCRIPTION OF THE BACKGROUND

Poly(aryl-ether-ketones) are well-known high-performance engineering polymers. They are used for applications with temperature and/or mechanical constraints, or even chemical constraints. These polymers can be found in fields as varied as aeronautics and aerospace; offshore drilling; automobile, train and ship building; wind power; sporting goods; construction; electronics; and medical implants. They can be used by all thermoplastic processing technologies, such as moulding, compression, extrusion, spinning, powder coating, or sintering prototyping.

Two synthetic routes are used to produce Poly(aryl-ether-ketones). A first route lies in a so-called nucleophilic substitution process. This process is however complex to implement, as access to the monomers is difficult because special fluorinated or chlorinated monomers must be produced. The synthesis conditions of the nucleophilic substitution process are also difficult (350°-400° C.) in diphenylsulphone) and the post-reaction treatments are constraining (difficultly removing the salts and the solvent).

A second route lies in a so-called electrophilic substitution process, which can be conducted at either high temperature or room temperature. The advantage of this second process stems from the possibility of polymerizing at moderate temperatures (−20° C. to 120° C.), which limits side reactions. Moreover, both the monomers and the solvents are more industrially accessible.

The latter process is widely described in the literature, for instance U.S. Pat. Nos. 4,841,013, 4,816,556, 4,912,181, 4,698,393, WO9500446, U.S. Pat. No. 4,716,211, or WO2011004164.

The electrophilic substitution reaction is carried out between one or more aromatic acid chlorides and one or more aromatic ethers in the presence of a Lewis acid. It takes place in a solvent, sometimes in the presence of a dispersant (U.S. Pat. No. 4,698,393, WO9500446), and is generally carried out in two steps with a first phase at room temperature or even below 0° C., then the reaction is completed at a temperature comprised between 0° C. and 120° C. depending on the solvent. It is also possible to work at higher temperature, but that route generates more side reactions. The reaction mixture is then treated with a protic compound to extract all or part of the Lewis acid. The choice of the protic compound depends on the solvent used. In U.S. Pat. No. 4,841,013 and WO2011004164, U.S. Pat. No. 4,716,211 or 4,912,181 the solvent used is dichloromethane and the protic compound is water. In U.S. Pat. No. 4,716,556, WO9500446, the solvent is ortho-dichlorobenzene and the protic compound is methanol.

Although the invention is by no means limited to this process, only the preferred process of synthesis by electrophilic substitution reaction is described in the following description.

The laser sintering process is particularly sensitive to emission of fumes. During electromagnetic radiation-generated sintering of a PAEK powder, the powder is kept at high temperature, typically at a temperature above 240° C. and up to 300° C. for PEKK, such as Kepstan 6000 marketed by Arkema, throughout the construction of the part, which can last several hours to several tens of hours depending on the part's complexity. The melting of the PAEK powder, generated by the electromagnetic radiation emitted by the laser, causes a local and very brief temperature peak that can lead certain components to enter the vapour phase. The volatile compounds emitted then condense on the lens of the laser, which becomes fouled. As the lens becomes increasingly fouled, the laser beam energy received by the powder tends to decrease. Consequently, if nothing is done to clean the lens, the mechanical properties of the parts fabricated by laser sintering decrease over time, because the more the lens is fouled, the less electromagnetic radiation energy is received by the powder, and the less the sintering is effective.

Therefore, it is advisable to use a PAEK composition whose content of condensable volatile compounds is sufficiently low to ensure the consistency of the mechanical properties of the parts during all construction cycles, while limiting lens cleaning operations.

PAEK compositions with low emissions of condensable fumes or vapours during the construction of three-dimensional parts are therefore particularly attractive for this sintering application.

Patent application WO2014013202, filed by the applicant, describes a Poly-aryl-ether-ketone production process by electrophilic substitution reaction between one or more aromatic acid chlorides and one or more aromatic ethers, in the presence of a Lewis acid. This reaction is carried out in an aprotic solvent that dissolves water only very sparingly and in two steps. A first phase of the reaction is carried out at a temperature between −5° C. and 25° C. under stirring, then the reaction is completed at a temperature comprised between 50 and 120° C. The PAEK obtained then the reaction medium is brought into contact with water in the optional presence of acid and is separated from the liquid effluents. A subsequent step of washing the PAEK obtained with water makes it possible to extract all or part of the Lewis acid. The applicant noticed that it is preferable to avoid the use of alcohol to carry out this washing step, because alcohol contributes to the appearance of side reactions, which make it less stable. This process thus produces a very stable polymer. However, the applicant observed that the PAEK composition obtained by this process still generates condensable vapours during sintering, which means that it still contains significant levels of compounds likely enter the vapour phase under the effect of electromagnetic radiation.

After analysis of these condensable vapours, it turns out that they also contain aromatic ether-based compounds and compounds from aluminium hydroxy complexes.

The applicant therefore sought to further improve the PAEK composition, in order to reduce the levels of compounds likely to vaporize under the action of electromagnetic radiation and foul the lens of the optical system of the sintering equipment.

SUMMARY OF THE INVENTION

The invention thus aims to remedy at least one of the disadvantages of the prior art. In particular, the invention aims to propose a poly-aryl-ether-ketone composition comprising sufficiently low contents of aromatic ether and of aluminium that they no longer generate condensable vapours likely to foul the lens of the optical system of the sintering equipment.

The invention also aims to propose a process for synthesizing a PAEK composition which sufficiently removes the compounds likely to vaporize so that they no longer generate vapours that would foul the lens of the optical system of the sintering equipment.

Finally, the invention aims to propose a three-dimensional article obtained by the sintering of a powder of such a PAEK composition, layer by layer, using electromagnetic radiation, said three-dimensional article having mechanical properties that are satisfactory and substantially constant over time.

BRIEF DESCRIPTION OF THE INVENTION

To that end, the invention relates to a Poly(aryl-ether-ketone) composition (PAEK) useful in a process for building a three-dimensional object layer by layer by electromagnetic radiation-generated sintering, said composition being characterized in that it has an aromatic ether content comprised between 0 and 0.4% by mass and an aluminium mass content lower than 1000 ppm, preferably lower than 600 ppm and more preferably lower than 500 ppm.

Such a composition does not generate condensable vapours or does so in sufficiently small amounts not to cause fouling of the lens when said composition is sintered.

According to other optional features of the composition:

- preferably, the aromatic ether content is comprised between 0 and 0.3% by mass,
- more preferably, the aromatic ether content is comprised between 0 and 0.2% by mass, and even more preferably between 0 and 0.1% by mass,
- the composition further comprises an aluminium mass content lower than 1000 ppm, preferably lower than 600 ppm, more preferably lower than 500 ppm, and in particular between 10 and 250 ppm or even between 5 and 100 ppm,
- the composition comprises at least polyether-ketone-ketone (PEKK) which represents more than 60% by mass, preferably more than 70% by mass of the composition, bound included,
- the composition is a Polyether-ketone-ketone (PEKK) composition,
- the aromatic ether is (1,4-phenoxybenzoyl) benzene,
- the composition is in powder form.

To obtain such a composition, the applicant surprisingly discovered that the PAEK composition, when synthesized by a conventional electrophilic substitution reaction, could be washed a first time with a water/alcohol mixture to remove the aluminium derived from the Lewis acid.

More particularly, the process for synthesizing of the composition consists in bringing one or more aromatic acid chlorides and one or more aromatic ethers into contact in the presence of a Lewis acid in a solvent that dissolves water only at a concentration lower than 0.05% by mass at 25° C. at a temperature comprised between −5 and +25° C. under stirring, in completing the polymerization at a temperature comprised between 50 and 120° C., then in bringing the reaction mixture into contact with water under stirring in the optional presence of acid, in separating the poly-aryl-ether-ketone from the liquid effluents, in washing the poly-aryl-ether-ketone in the optional presence of acid and separating the liquors, and finally in drying the poly-aryl-ether-ketone obtained at a temperature 20° C. above the glass transition temperature Tg; and this process is more particularly characterized in that the step of washing the poly-aryl-ether-ketone and of separating the liquors consists in:

- carrying out a first washing with a water/alcohol mixture and separating the liquors,
- carrying out at least one further washing with water or acidic water and separating the liquors.

As explained in document WO2014013202, alcohol is not a desired solvent for the washing step because it is known to cause side reactions. However, when the alcohol is mixed with water in mass proportions comprised between 95 and 60%, preferably between 95 and 80%, the mixture reduces both the aromatic ether content and the aluminium content without leading to side reactions. Preferably, the alcohol is selected from at least one of the following alcohols: methanol, ethanol or isopropanol.

The invention further relates to the use of such a composition in powder form in a process for building an object layer by layer by electromagnetic radiation-generated sintering.

Finally, the invention relates to a three-dimensional article obtained by layer-by-layer sintering of a powder using electromagnetic radiation, said powder being characterized in that its composition conforms to that described above.

Other advantages and features of the invention will become more readily apparent by reading the following description provided by way of illustrative and non-limiting example.

DETAILED DESCRIPTION OF THE INVENTION

By way of preamble, it is specified that the terms "comprised between" and/or "lower than" and/or "above" used within the context of this description must be understood as including the cited bounds.

The term "build temperature" refers to the temperature at which the powder bed, of a constituent layer of a three-dimensional object being built, is heated during the layer-by-layer sintering process of the powder.

The PAEK composition according to the invention is synthesized from different combinations of aromatic acid di-chlorides and acid mono-chlorides and aromatic ethers and/or aromatic biphenyls.

Preferably, the acid chlorides will be selected from terephthaloyl chloride (TCI) and isophthaloyl chloride (ICI) or a mixture thereof, in proportions such that in the final PAEK structure, there is a para-diketophenyl/meta-diketophenyl unit ratio of 100 to 50% and preferably of 85 to 55%% and more particularly of 82 to 60%.

The acid monochlorides will be selected from benzoyl chloride and benzene sulfonyl chloride.

Preferably, the following aromatic ethers or aromatic biphenyls will be selected: Diphenyl ether, 1,4-(phenoxybenzoyl) benzene (EKKE), biphenyl, 4-phenoxybenzophenone, 4-chlorobiphenyl, 4-(4-phenoxyphenoxy) benzophenone, and biphenyl 4-benzenesulphonylphenyl phenylether.

Poly-(aryl-ether-ketones) (PAEKs) consist of units having the following formulae:

(—Ar—X—) and (—$Ar_1$—Y—)

wherein:

- Ar and $Ar_1$ each denote a divalent aromatic radical;
- Ar and $Ar_1$ may preferably be selected from 1,3-phenylene, 1,4-phenylene, 4,4'-biphenylene, 1,4-naphthylene, 1,5-naphthylene and 2,6-naphthylene;
- X denotes an electron-withdrawing group; it may preferably be selected from the carbonyl group and the sulfonyl group,
- Y denotes a group selected from an oxygen atom, a sulphur atom, an alkylene group, such as —$CH_2$— and isopropylidene.

In these units X and Y, at least 50%, preferably at least 70%, and more particularly at least 80% of the groups X are a carbonyl group, and at least 50%, preferably at least 70%, and more particularly at least 80% of the groups Y represent an oxygen atom. According to a preferred embodiment, 100% of the groups X denote a carbonyl group and 100% of the groups Y represent an oxygen atom.

More preferentially, the poly-arylene-ether-ketone (PAEK) may be selected from:

- a poly-ether-ketone-ketone, also called PEKK, comprising units of Formula I A, Formula I B and a mixture thereof:

Formula I A

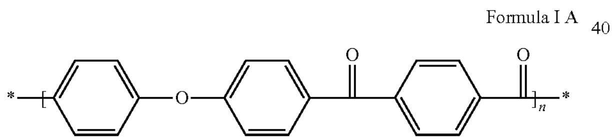

Formula I B

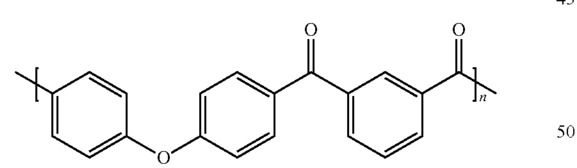

- a poly-ether-ether-ketone, also called PEEK, comprising units of Formula II:

Formula II

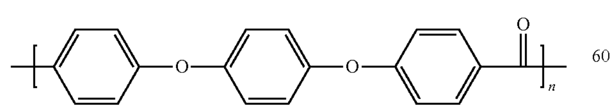

The sequences can be totally para (Formula II). Similarly, meta sequences can be introduced, partially or totally, into these structures at the ethers and the ketones according to the two examples of Formulae III and IV below:

Formula III

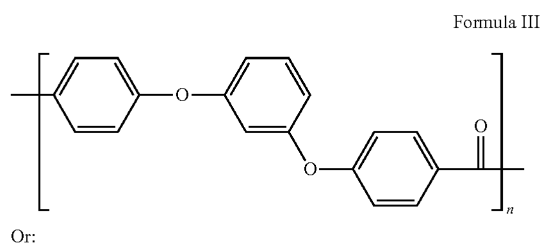

Or:

Formula IV

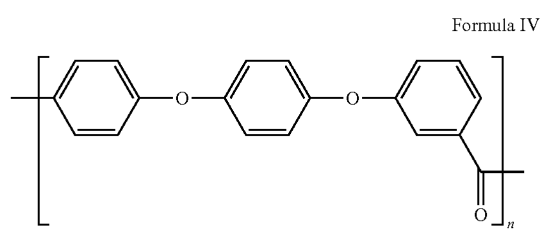

Or ortho sequences according to Formula V:

Formula V

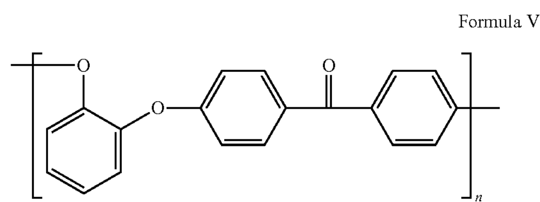

- a poly-ether-ketone, also called PEK, comprising units of Formula VI:

Formula VI

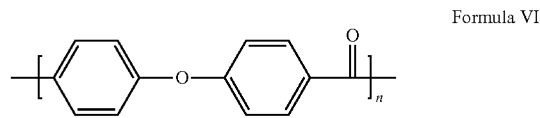

Similarly, the sequence may be totally para, but meta sequences can also be partially or totally introduced (Formulae VII and VIII):

Formula VII

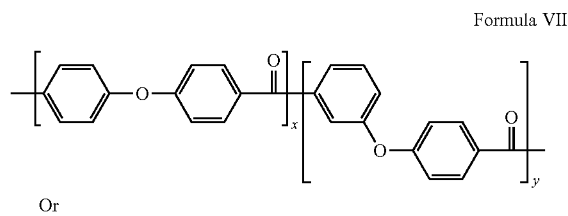

Or

Formula VIII

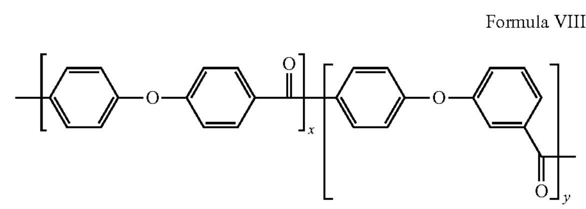

a poly-ether-ether-ketone-ketone, also called PEEKK, comprising units of Formula IX:

Formula IX

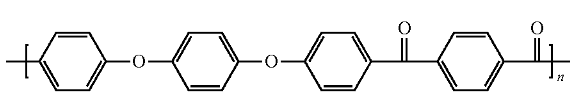

Similarly, meta sequences can be introduced into these structures at the ethers and the ketones.

a poly-ether-ether-ether-ketone, also called PEEEK, comprising units of Formula X:

Formula X

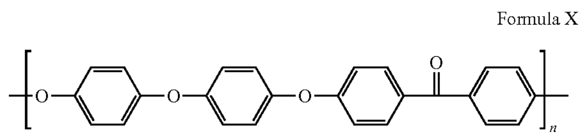

Similarly, meta sequences can be introduced into these structures at the ethers and the ketones, but also biphenol sequences according to Formula XI:

Formula XI

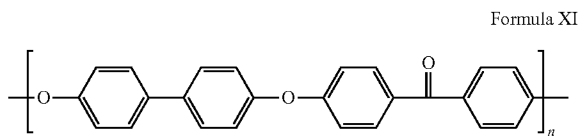

Other arrangements of the carbonyl group and the oxygen atom are also possible.

Preferably, the PAEKs used in the invention are selected from PEKKs, PEEK or PEEK-based copolymers, PEK or PEK-based copolymers.

During the synthesis of these Poly-aryl-ether-ketones, by the preferred electrophilic substitution reaction process, the following Lewis acids are preferably used: Anhydrous aluminium trichloride, anhydrous aluminium tribromide, and more preferably anhydrous aluminium trichloride.

The solvents used are acid chloride solvents and not polymer solvents and dissolve water at a concentration<0.2% by mass, preferably <0.05% by mass. Preferably, it is orthodichloro-benzene.

The different phases of the synthesis process can be performed in the same reactor or in a succession of several reactors. A first phase of the reaction is carried out at a temperature between −5° C. and 25° C. under stirring, then the polymerization reaction is completed at a temperature comprised between 50 and 120° C. The PAEK obtained is separated from the liquid effluents after bringing the reaction medium into contact with water in the optional presence of acid. This separation step is followed by a washing step.

Advantageously, this washing step consists in bringing the synthesized PAEK, for example a PEKK, into contact with a water/alcohol mixture, under stirring between 15 and 60° C., preferably between 25 and 50° C., and in maintaining this stirring for one hour. According to one variant, the water/alcohol mixture can also be added to a reactor after the PAEK has been introduced.

This washing sequence can be divided into several successive sequences depending on the size of the equipment used.

The water/alcohol mixture used represents 15 to 50 times the mass of PAEK to be washed. The water can be acidified up to 10% pure hydrochloric acid, preferably 4%.

The alcohol is preferably selected from at least one of the following alcohols: methanol, ethanol or isopropanol. It acts as solvent and complexing agent for the aluminium and thus promotes its removal.

However, the proportions of alcohol in the mixture should not be so high as to cause side reactions. Neither must they be too low to allow sufficient removal of the aluminium.

Therefore, a compromise must be reached on the proportions of alcohol. Thus, the mass proportions of alcohol in the water/methanol mixture are preferably comprised between 95 and 60%, preferably between 95 and 80%.

After said washing, the reaction mixture is separated from the majority of the liquors by a suitable separator.

The liquors are subjected to appropriate treatments, decantation, neutralization, distillation and resin treatment allowing them to be recovered or recycled in the process.

The polymer is then subjected to several further steps of washing with water or acidic water, then separation.

Finally, a step of drying the polymer is carried out at a temperature 20° C. above the glass transition temperature Tg under 30 mbar.

The product obtained has an aromatic ether content comprised between 0 and 0.4% by mass. Preferably this content is comprised between 0 and 0.3% by mass, and more preferably it is comprised between 0 and 0.2% by mass. Aromatic ether means compounds having a molar mass lower than 500 $g \cdot mol^{-1}$, such as EKKE whose molar mass is 470 g/mol. The Al mass content in the product obtained is lower than 1000 ppm, preferably lower than 600 ppm, and more preferably lower than 500 ppm.

Such a composition can be used in powder form in a process for building an object using electromagnetic radiation, notably laser radiation, consisting in irradiating the powder layer by layer, following a predetermined path, in order to locally melt the poly-aryl ether-ketone and obtain said object.

The composition comprises at least polyether-ketone-ketone (PEKK) which represents more than 60% by mass, preferably more than 70% by mass of the composition, bound included. The remaining 30 to 40% by mass may for example consist of other polymers belonging to the PAEK family, and/or fibres, such as carbon fibres, glass fibres for example, and/or fillers such as mineral fillers, glass beads or carbon blacks, graphites, graphenes, carbon nanotubes.

The PAEK composition is preferably a Polyether-ketone-ketone (PEKK) composition, and the aromatic ether is (1,4-phenoxybenzoyl) benzene (EKKE).

The composition is in powder form, ready for use in an electromagnetic radiation-generated sintering process to produce three-dimensional objects layer by layer.

Finally, the invention relates to a three-dimensional article obtained by sintering a powder layer by layer using electromagnetic radiation, said powder being a PAEK powder having a composition in which the aromatic ether content is comprised between 0 and 0.4% by mass. Furthermore, the aluminium mass content in the composition is lower than 1000 ppm, preferably lower than 600 ppm, and more preferably lower than 500 ppm. Such a powder generates very little or no vapour, so that the lens of the sintering equipment does not become fouled and the three-dimensional articles fabricated with such a powder have mechanical properties that are satisfactory and constant over time.

EXAMPLES

1. Comparison of Lens Condition as a Function of EKKE Content Measured on Various PEKK Samples Protocol for Measuring the Aromatic Ether Content:

The samples are dissolved in a BTF/HFIP mixture in the presence of an internal standard.

All analyses were performed on a VARIAN® 3800 GC equipped with a 1041 on-column injector and a FID.

Column: MXT 500 Sim Dist 6 m/320 μm/ef=0.15 μm

Temperature Det (FID)=400° C.

1041 injector temperature=set at T≥40° C.

Column flow rate (constant flow)=3 ml/min,

Oven programming=40° C. (2 min)→150° C. to 8° C./min

150° C. (0 min)→330° C. (0 min) at 15° C./min

330° C. (0 min)→360° C. (5 min) at 25° C./min

Carrier gas=helium

Injection mode: in the column with the injection point located in the part regulated by the oven Injection volume=0.5 μl Sintering tests were performed on three PEKK samples. A first product A, synthesized and marketed by OPM with the product designation OxPEKK, has an EKKE mass content, measured by GC, of 1.13%. A product B, a PEKK marketed by Arkema with the product designation Kepstan 6000 and synthesized according to the process described in document WO2014013202, with washing exclusively with water, has an EKKE content, measured by GC, of 0.45%. A third product C, a Kepstan 6000 PEKK synthesized according to the same process as for product B, but whose first washing step is carried out with a water/methanol mixture whose mass proportions of alcohol are comprised between 95 and 60%, preferably between 95 and 80%, has an EKKE content, measured by GC, of 0.25% by mass.

These sintering tests were conducted at a build temperature of 285° C. These tests revealed that the first two products, A and B, generate a significant release of vapours during the test (see Table I below). These vapours condense on the lens. Analysis of a sample of this condensate shows the presence of EKKE. In addition to fouling the machine, this lens deposit changes the energy received by the PEKK powder, which does not sinter properly, and the resulting three-dimensional object thus has mechanical properties that decrease over time.

TABLE I

| | EKKE content (%) | Lens condition |
|---|---|---|
| Product A | 1.13% | Deposit |
| Product B | 0.45% | Deposit |
| Product C | 0.25% | No deposit |

2. Comparison of Lens Condition as a Function of Al Content

Method for Determining the Aluminium Content

Mineralization:

Weigh 0.5 g of the sample in a digitube.

Add 10 mL of 67% nitric acid

Heat 2 hours at 99° C. in a heating block

Filter on a Whatman filter (589/1 diam 125 mm)

Make up to the mark with a final volume of 25 mL with Milly Q water

Quantification:

By the optical ICP/AES technique (Vista Pro ICP, Varian)

Standard is run before and after the sample to control drift

Working wavelength: 396.15 nm for the element aluminium

Two samples of product B (samples numbered 5 and 6 in Table II below) and four samples of product C (samples numbered 1 to 4 in Table II below) from Example 1 were compared. The aluminium mass content of each sample was measured by the method described above. Product B, corresponding to a PEKK of the prior art, has an aluminium content comprised between 1900 and 2000 ppm depending on the samples. Product C, in conformity with the invention, has an aluminium content that varies from 8 ppm, 9 ppm to 800 ppm depending on the samples.

Thermogravimetric analyses (TGA) were performed with a Netzsch TG209F1 device. This device consists of two main components: a highly sensitive microbalance coupled with a temperature-controlled oven. The microbalance is capable of detecting a variation of 0.1 mg for a maximum capacity of 1.3 g. The sample is placed in a platinum crucible and the beam keeps the platform in balance via a current proportional to the supported mass. The temperature is set between 30° C. and 1000° C. with temperature increases up to 200° C.·min$^{-1}$. A thermocouple near the sample is used to monitor the temperature and regulate the heat output. Calibration was performed with Indium and Zinc with Curie points of 157° C. and 420° C., respectively.

All TGA on the samples were performed isothermally, under nitrogen, at a temperature of 285° C., corresponding to the laser sintering build temperature, for one hour. The measured mass losses are shown in Table II below.

TABLE II

Isothermal TGA 1 h at 285° C. under N2

| Samples | Isothermal mass losses in % m | Al content |
|---|---|---|
| 1 - Product C | 0 | 8 ppm |
| 2 - Product C | 0 | 9 ppm |
| 3 - Product C | 0 | 200 ppm |
| 4 - Product C | 0 | 800 ppm |
| 5 - Product B | 0.3 | 1900 ppm |
| 6 - Product B | 0.2 | 2000 ppm |

These TGA mass-loss measurements show that there is a correlation between the thermal stability of the PEKK sample and its aluminium content. For example, at aluminium contents below 1000 ppm, the PEKK composition is thermally stable.

The results obtained by TGA show that the aluminium in samples 5 and 6 of product B of the prior art forms complexes likely to generate vapours under the effect of temperature, which generate vapours sufficient to foul the lens of the sintering equipment. Product C according to the invention contains aluminium contents low enough not to generate vapours, no loss of mass being detected. The lens of the sintering equipment is thus not fouled when sintering the PEKK powder according to the invention.

The PAEK composition according to the invention thus makes it possible to preserve the sintering equipment and to obtain three-dimensional sintered objects with mechanical properties that are satisfactory and constant over time.

The invention claimed is:

1. A composition suitable for a process of building a three-dimensional object layer-by-layer by electromagnetic radiation-generated sintering, comprising at least one poly (aryl-ether-ketone) (PAEK), wherein the composition has an aromatic ether content of from 0 and 0.4% by mass, based on the total mass of the composition, and the composition has an aluminum mass content of lower than 1000 ppm.

2. The composition of claim 1, which comprises at least 60% by mass, based on the total mass of the composition, of the poly(aryl-ether-ketone) (PAEK).

3. The composition of claim 1, which comprises at least 70% by mass, based on the total mass of the composition, of the poly(aryl-ether-ketone) (PAEK).

4. The composition of claim 1, wherein the poly(aryl-ether-ketone) (PAEK) is a polyether-ketone-ketone (PEKK).

5. The composition of claim 4, which comprises at least 60% by mass, based on the total mass of the composition, of the polyether-ketone-ketone (PEKK).

6. The composition of claim 4, which comprises at least 70% by mass, based on the total mass of the composition, of the polyether-ketone-ketone (PEKK).

7. The composition of claim 1, wherein the aromatic ether is (1,4-phenoxybenzoyl) benzene.

8. The composition of claim 1, wherein the content of the aromatic ether is 0 to 0.2% by mass, based on the total mass of the composition.

9. The composition of claim 1, wherein the content of the aromatic ether content is 0 to 0.1% by mass, based on the total mass of the composition.

10. The composition of claim 1, which has an aluminium mass content of lower than 600 ppm.

11. The composition of claim 1, which has an aluminium mass content of 10 to 250 ppm.

12. The composition of claim 1, which has an aluminium mass content of 5 to 100 ppm.

13. The composition of claim 1, which is in the form of a powder.

14. The composition of claim 13, which generates no vapor when subjected to sintering with electromagnetic radiation.

15. A process for building an object comprising sintering the composition of claim 1 with electromagnetic radiation.

16. The process of claim 15, wherein the sintering is conducted layer-by-layer.

17. The process of claim 15, wherein the object is three-dimensional.

18. A three-dimensional object obtained by sintering the composition of claim 1 electromagnetic radiation.

19. A process for preparing the composition of claim 1, comprising:

contacting at least one aromatic acid chloride and at least one aromatic ether in the presence of a Lewis acid in a solvent that dissolves water at a concentration lower than 0.05% by mass at 25° C., at a temperature of from −5 to +25° C. under stirring, polymerizing the aromatic acid chloride and the aromatic ether at a temperature of from 50 to 120° C. to produce the poly(aryl-ether-ketone) (PAEK), contacting the reaction mixture with water under stirring, washing the poly(aryl-ether-ketone) (PAEK) and separating the liquors, and drying the poly(aryl-ether-ketone) (PAEK).

20. The method of claim 19, wherein the poly(aryl-ether-ketone) (PAEK) is dried at a temperature 20° C. above the glass transition temperature Tg.

21. The process of claim 19, wherein washing the poly (aryl-ether-ketone) (PAEK) and separating the liquors comprises:

carrying out a first washing with a water/alcohol mixture and separating the liquors, wherein the water/alcohol mixture comprises from 60% to 95% by mass of the alcohol, and carrying out at least one further washing with water or acidic water and separating the liquors.

22. The process of claim 21, wherein the alcohol comprises at least one of methanol, ethanol or isopropanol.

* * * * *